(12) United States Patent
Francis

(10) Patent No.: US 7,873,127 B2
(45) Date of Patent: Jan. 18, 2011

(54) WEIGHTING A SIGNAL RECEIVED BY AN ANTENNA ARRAY TO ENHANCE THE SIGNAL AND SUPPRESS INTERFERENCE

(75) Inventor: James Covosso Francis, Fairport, NY (US)

(73) Assignee: L-3 Communications Titan Corporation, San Diego, CA (US)

( * ) Notice: Subject to any disclaimer, the term of this patent is extended or adjusted under 35 U.S.C. 154(b) by 918 days.

(21) Appl. No.: 11/803,561

(22) Filed: May 14, 2007

(65) Prior Publication Data

US 2008/0287164 A1 Nov. 20, 2008

(51) Int. Cl.
*H04B 7/10* (2006.01)
(52) U.S. Cl. .................................. 375/347; 455/562.1
(58) Field of Classification Search ................. 375/347, 375/346; 455/562.1
See application file for complete search history.

(56) References Cited

U.S. PATENT DOCUMENTS

| 6,404,803 B1* | 6/2002 | Wang et al. ................. 375/148 |
| 2004/0142665 A1* | 7/2004 | Papathanasion et al. ..... 455/101 |

* cited by examiner

*Primary Examiner*—Temesghen Ghebretinsae
(74) *Attorney, Agent, or Firm*—Edward W. Callan

(57) ABSTRACT

Sample vectors of a signal received simultaneously by an array of antennas are processed to estimate a weight for each sample vector that maximizes the energy of the individual sample vector that resulted from propagation of the signal from a known source and/or minimizes the energy of the sample vector that resulted from interference with propagation of the signal from the known source. Each sample vector is combined with the weight that is estimated for the respective sample vector to provide a plurality of weighted sample vectors. The plurality of weighted sample vectors are summed to provide a resultant weighted sample vector for the received signal. The weight for each sample vector is estimated by processing the sample vector in accordance with the expression:

$$\min_{\underline{w},\underline{c}} \| X^* Y \underline{w} - (C_0 \underline{c}_0 + C \underline{c}) \|^p$$

where $\underline{c}_0 = 1$ and $0 < p \leq \infty$. The processing of the sample vector to estimate the weight $\underline{w}$, includes a step of calculating a pseudoinverse $(ZX^*Y)^+$. The pseudoinverse is calculated by a simplified method.

13 Claims, 7 Drawing Sheets

```
In[28]:= (*This code is written in Mathematica 5.2, a product of the Wolfram Research, Inc.*)

(*
         This code exemplifies the algorithm described in the patent to solve the following:
```
$$\min_{\underline{x},\underline{c}} \| X^* \, Y \, \underline{v} - (C_0 \, \underline{c_0} + C \, \underline{c}) \|^2 \text{ where } \underline{c_0} = 1 \ ;$$
```
         The output of the processing is:
```
$Y \, \tilde{\underline{v}}$ ;
```
         *)

(*Read in various libraries*)
         << Graphics`
         << Statistics`
         << LinearAlgebra`

Off[General::spell1]

In[32]:= (*
         This is an implementation of the Shifted QR method,
         a standard numerical method to determine the eigenvalues of a matrix
          aa. See for example, Strang, Linear Algebra and Applications,
         Second Edition. The prefix "my" is used because Mathematica has a built-
          in function of the same name. The built-
          in Mathematica function is not used to faciliate porting.
         *)
         myeigenvalues[aa_] := Module[{ε = 10^-6, zz, n, λ, δ, i, α, qq, rr},
           zz = aa;
           n = Length[zz];
           λ = {};
           While[n > 1,
             δ = 2 ε;
             For[i = 1, (i ≤ 10) && (δ > ε), ++i,
               If[Max[Abs[Drop[Last[zz], -1]]] < ε, α = zz[[n, n]], α = 0];
               {qq, rr} = QRDecomposition[zz - α IdentityMatrix[n]];
               qq = qq';
               zz = rr.qq + α IdentityMatrix[n];
               δ = Max[Abs[Drop[Last[zz], -1]]];
             ];
             λ = Append[λ, zz[[n, n]]];
             zz = SubMatrix[zz, {1, 1}, {n - 1, n - 1}];
             --n;
           ];
           λ = Append[λ, zz[[1, 1]]];
           λ = λ[[Reverse[Ordering[Abs[λ]]]]]
         ]

(*
         This is an implementation of the Shifted Inverse Power method,
         a standard numerical method to determine an eigenvector of a
          matrix aa that is associated with eigenvalue λ. See for example,
         Strang, Linear Algebra and Applications,
```

FIG. 3A

```
Second Edition.  The prefix "my" is used because Mathematica has a built-
in function of the same name.  The built-
in Mathematica function is not used to faciliate porting.
*)
myeigenvector[aa_, λ_] := Module[{ε = .01, n, bb, u, lsf},
  n = Length[aa];
  bb = aa - (λ - ε) IdentityMatrix[n];
  u = Table[0, {n}];
  u[[1]] = 1;
  (*If PLU factorization fails, try +/- ε*)
  lsf = LinearSolve[bb];
  u = lsf[u]; u = u / Norm[u];
  u = lsf[u]; u = u / Norm[u];
  u = lsf[u]; u = u / Norm[u];
  u
]

(*
This exemplifies the calculation of the pseudoinverse of a matrix aa,
as described in the patent,
including the simplification when # rows (aa)>># cols (aa)  (or vice versa).
*)
mypseudoinverse[aa_] := Module[{ε = 10^-2, bb, λ, vv, ww, uu, aapinv},
  bb = aa'.aa;
  (*Use QR in general.  The roots of the
     characteristic polynomial could be used for <5 antenna elements.*)
  λ = Re[myeigenvalues[bb]];
  (*The right factor vv has the eigenvectors of bb.*)
  vv = Transpose[Map[myeigenvector[bb, #] &, λ]];
  (*The center factor.*)
  ww = DiagonalMatrix[Map[If[Abs[#] > ε, 1 / Sqrt[#], 0] &, λ]];
  (*Use SVD decomposition of aa=uu.ww.vv' to obtain uu.  uu is the left factor.*)
  uu = aa.(vv.ww);
  (*Obtain the desired pseudoinverse.*)
  aapinv = (vv.ww).uu'
]

In[35]:= (*One time initialization of tables.*)
         initializearrayprocess[] := Module[{},
           (*Frames/ second*)
           framerate = 2400 / framesize;

nullcount = 5;
           nullspacing = 10;
           (*β is the assumed bandwidth of the channel process*)
           β = framerate / nullspacing // N;
           sinc = Compile[{x},
             If[x ≠ 0, Sin[x] / x, 1]];
           hamming = Compile[{x},
             If[Abs[x] ≤ 1, 0.54 + 0.46 Cos[π x], 0]];
           basis = Compile[{n},
```

FIG. 3B

```
    If[Abs[n] ≤ nullcount*nullspacing,
      sinc[π n / nullspacing] hamming[n / (nullcount*nullspacing)], 0]];

(*
   The column space of cc is the channel model.  cc is {C₀|C} in the
    patent.  See body of this patent additional explanation and references.
   *)
  twindow = Length[txk];
  tcenter = twindow / 2;
  cwcount = Ceiling[tcenter / nullspacing] + nullcount;
  cc =
    Table[basis[n - tcenter - m nullspacing], {m, -cwcount, cwcount}, {n, 0, twindow - 1}];
  cc = Select[cc, Max[Abs[#]] > .01 &];
  cc = Transpose[cc];

(*ccz is C₀ in the patent, and ccnz is C in the patent.*)
  n = Round[(Last[Dimensions[cc]] + 1) / 2];
  ccz = cc[[All, n]];
  i = Delete[Table[m, {m, Last[Dimensions[cc]]}], n];
  ccnz = cc[[All, i]];
  (*t1 and t2 appear in subexpressions of U in patent*)
  t1 = Inverse[ccnz'.ccnz];
  t2 = t1.ccnz';

(*Δ is for a frequency search over a small window.*)
  Δ = N[
    e^(2 π i (β / 2) / framerate Table[k (n - 1), {k, -1, 1}, {n, First[Dimensions[txk]]}])];
  ]

arrayprocess[yy_] :=
  Module[{corr, μ, corrt, corrtf, we, cwe, ce, μopt, weopt, s1, s2, s3, s4},
    (*X* Y is obtained from corr at each require time offset*)
    corr =
      (1 / sizek) Map[Table[ListCorrelate[Conjugate[txk[[i]]], #[[Range[1, sizek + 16 - 1] +
            (i - 1) (sizek + sizeu)]]], {i, Length[txk]}] &, Transpose[yy]];
    (*s1 and s2 are some convenient subexpressions.*)
    s1 = ccz - ccnz.(t1.(ccnz'.ccz));
    s2 = t2.ccz;
    μ = Table[
      (*Extract X* Y associated with time offset i from corr.*)
      corrt = Transpose[Map[#[[All, i]] &, corr]];
      Table[
        (*Extract X* Y associated
          with time offset i from corr and frequency offset j.*)
        corrtf = If[j ≠ 2, corrt Δ[[j]], corrt]; (*j=2 is zero offset*)
        s3 = corrtf - ccnz.(t1.(ccnz'.corrtf));
        (*Compute the optimal weights for this time and frequency,
         using the expression for ỹ in the patent.*)
        (*we=PseudoInverse[s3,Tolerance→.001].s1 ;*)
        we = mypseudoinverse[s3].s1;
        s4 = corrtf.we;
```

FIG. 3C

```
        (*Compute the optimal c for this time and frequency,
          using the expression for c̄ in the patent.  cwe is c̄ in the patent.*)
        cwe = t2.s4 - s2;
        (*ce is C₀ c₀ + C c̄ in the patent.*)
        ce = ccz + ccnz.cwe;
        (*Return results.  (Norm[ce]^2/Norm[ce-s4]^2 is an estimate of $\frac{S}{N}$.*)
        {Norm[ce]^2/Norm[ce-s4]^2, we, i, j},
        {j, Length[Δ]}],
       {i, Last[Dimensions[corr]]}
      ];
    μ = Flatten[μ, 1];
    (*Return the results with the highest $\frac{S}{N}$,
      over the time and frequency window searched.*)
    {μopt, weopt, tidx, fidx} = μ[[Ordering[First[Transpose[μ]], -1][[1]]]]
    (*μopt is an S/N ratio measure,
      with optimal array-processed samples as yy.weopt*)
  ]

In[37]:= (*Get a prototype transmit signal in order to build up
          txk below.  This file may be any constant modulus sequence.*)
        tx = Import["C:\\txSamples.dat", "Complex64"];
        rx = tx;

sizek = 16;
        sizeu = 32;
        framesize = sizek + sizeu;
        sizetx = sizek + 2 120 framesize;
        tx = Take[tx, sizetx];

(*
          txk is a matrix that holds the known.  This is the matrix
          X in the patent.  X is sparse, and here it is stored compactly
          (without the zeros).  txu holds the unknown signal obtained from the
          transmit.  The receiver does not know txu, and txu is actually not used.
        *)
        txk = Prepend[
            Map[Drop[#, sizeu] &, Partition[Drop[tx, sizek], sizek + sizeu]], Take[tx, sizek]];
        txu = Map[Take[#, sizeu] &, Partition[Drop[tx, sizek], sizek + sizeu]];

initializearrayprocess[];
```

FIG. 3D

```
In[47]:= (*Seed the random number generator, so that simulation results are repeatable*)
        SeedRandom[2]
        n = Length[rx];
        x = rx;

arrayelements = 2;
        wx = RandomArray[NormalDistribution[0, 1], arrayelements] +
           i RandomArray[NormalDistribution[0, 1], arrayelements];
        (*The test case exhibited here is the first one discussed,
         that is, signal of interest with no noise.*)
        yy = Map[wx # &, x];
        (*This is a file export for testing ported code.*)
        (*Export["C:\Testyy.Dat",yy ,"Complex64"];*)

(*Return array processing results (with execution time).*)
        AbsoluteTiming[arrayprocess[yy]]

Out[53]= {0.2103192 Second, {1.17826×10⁶, {0.217874 + 0.247587 i, -0.322642 - 0.133058 i}, 1, 2}}

In[54]:= (*This is the correct answer (used to test code changes).*)
        {0.3795896`7.0308592986092755 Second,
          {1.178264333218873`*^6, {0.21787422276726642` + 0.24758677356120026 i,
            -0.3226418471754551` - 0.13305812628767738` i}, 1, 2}}

Out[54]= {0.3795896 Second, {1.17826×10⁶, {0.217874 + 0.247587 i, -0.322642 - 0.133058 i}, 1, 2}}
```

FIG. 3E

WEIGHTING A SIGNAL RECEIVED BY AN ANTENNA ARRAY TO ENHANCE THE SIGNAL AND SUPPRESS INTERFERENCE

BACKGROUND OF THE INVENTION

The present invention generally pertains to signal processing and is particularly directed to processing of a signal received by an array of antennas for the purpose of enhancing information that resulted from propagation of the signal from a signal source and for suppressing interference with said information.

The propagated signal is a particular sequence of modulated symbols that represent a message.

An example of a known signal source of a set of predetermined signal sources is a remote station in a radio network that includes a set of remote stations.

It is known to process sample vectors of a signal received simultaneously by an array of antennas to estimate a weight for each sample vector that maximizes the energy of the individual sample vector that resulted from propagation of the signal from a known signal source of a set of predetermined signal sources and/or minimizes the energy of the sample vector that resulted from interference with propagation of the signal from the known signal source; to combine each of the sample vectors with the weight that is estimated for the respective sample vector to provide a plurality of weighted sample vectors; and to sum the plurality of weighted sample vectors to provide a resultant weighted sample vector in which the known information is enhanced and the interference is suppressed.

A sample vector of a signal is a temporal sequence of measured values of the signal sampled over a predetermined duration. An estimated weight is a complex value. The sample vector of a signal that is received by an antenna is a sum of desired information and interference, with different complex weightings.

SUMMARY OF THE INVENTION

In one aspect, the present invention provides a method of processing a signal received simultaneously by an array of antennas for the purpose of enhancing information that resulted from propagation of the signal from a known signal source of a set of predetermined signal sources and for suppressing interference with said information, the method comprising the steps of:

(a) processing sample vectors of a signal received simultaneously by an array of antennas to estimate a weight for each sample vector that maximizes the energy of the individual sample vector that resulted from propagation of the signal from a known signal source of a set of predetermined signal sources and/or minimizes the energy of the sample vector that resulted from interference with propagation of the signal from the known signal source;

(b) summing each of the sample vectors with the weight that is estimated for the respective sample vector to provide a plurality of weighted sample vectors; and (c) summing the plurality of weighted sample vectors to provide a resultant weighted sample vector for the received signal;

wherein step (b) comprises the step of:

(d) processing the sample vector in accordance with the following expression:

$$\min_{\underline{w}, \underline{c}} \|X * Y\underline{w} - (C_0 \underline{c}_0 + C\underline{c})\|^p \qquad \{\text{Expression 1}\}$$

where $\underline{c}_0 = 1$ and $0 < p \leq \infty$.

$X$ represents known information symbols in a signal of interest, which is a signal propagated from a signal source of the set of predetermined signal sources. $X$ is an M×K matrix and holds portions of a PN sequence related to the known information.

The Hermitian (*) operator produces the conjugate transpose of $X$. Let the PN sequence be composed of complex values $p_i$, where $|p_i|=1$. So we have $p_0, p_1, \ldots, p_{M-1}$ for a vector of length M. Each column of $X$ is used to perform correlation against one of the known information symbols. Therefore, part of a column of $X$ is a part of the PN sequence, and the rest of the column is zeros.

$Y$ represents the sample vectors. $Y$ is an M×N matrix, where N is the number of antennas in an array of antennas. Each column of $Y$ is a sample vector representing a signal burst as received by one of the antennas. In the preferred embodiment the signal of interest is a series of signal bursts. In other embodiments the signal of interest may be continuous.

$\underline{w}$ is a vector of complex values.

The product $X*Y$ results in a matrix of correlation sums, and is K×N. Each column of the product contains correlation sums for the known symbols in the burst. Therefore, the rows represent the known symbols and the columns represent the antennas.

Each complex value of the vector is multiplied with each column of the product $X*Y$. The result of the complete product $(X*Y\underline{w})$ is a K×1 matrix of complex values, one for each known information symbol of X.

The column space of C and $C_0$ provides a basis for a channel estimate, where the basis function basis(n) is computed using the definitions:

Basis($n$)=Sin $c(\pi n/\text{nullspacing})$ Hamming ($n$/(nullcount nullspacing)), where Sin $c(x)$=Sin$(x)/x$, $x \neq 0$, 1 otherwise, Hamming$(x)$=0.54+0.46 Cos$(\pi x)$, $\|x\| \leq 1$ 0 otherwise, where n, nullcount and nullspacing are integers.

A matrix C' with elements $c'_{m,n}$ is computed as:

$c'_{m,n}$=Basis($m$-tcenter-$n$ nullspacing), where $m=\{0, 1, \ldots, K-1\}$,
$n=\{-\text{cwcount}, -(\text{cwcount}-1), \ldots, 0, 1, \text{cwcount}\}$,
tcenter=K/2, where K=the number of known symbols, and
cwcount=Ceiling(tcenter/nullspacing)+nullcount, where Ceiling is a standard mathematical function. Ceiling (x) is the largest integer that does not exceed x.

Matrix C is the matrix C' with one column, preferably the center column, removed, resulting in a K×(cwcount−1) matrix.

Matrix $C_0$ is the one column of the matrix C' that is removed from the matrix C' resulting in a K×1 matrix, where K is the number of known information symbols.

$\underline{c}_0$ and $\underline{c}$ are complex weights for the columns of $C_0$ and C. $\underline{c}_0=1$ by definition to thereby prevent a trivial solution to the objective of Expression 1. Vector $\underline{c}$ is a set of complex values that weight the columns of matrix C, and is (cwcount−1)×1. The result of the computation of $(C_0\underline{c}_0+C\underline{c})$ is a K×1 matrix.

The complete term $X^*Y\,\underline{w}-(C_0\underline{c}_0+C\underline{c})$ results in a K×1 matrix.

The terms maximize and minimize are used in relative sense instead of an absolute sense. Whether the estimated weight for a given sample vector maximizes the energy of the individual sample vector that resulted from propagation of a desired signal from a known signal source of a set of predetermined signal sources or minimizes the energy of the sample vector that resulted from interference with propagation of the desired signal from the known signal source or results in a combination of such maximization and minimization depends upon the energy of the interference in relation to the energy of the desired signal. In the absence of spatially white noise, the result is that which is described herein.

The present invention also provides a system for processing a signal received by an antenna in accordance with the method of this one aspect of the present invention.

The present invention further provides a non-transitory computer readable medium for use with one or more computers in a system for processing a signal received by an antenna in accordance with the method of this one aspect of the present invention.

As used herein, the term computer readable medium is not limited to one computer readable medium, but may also be interpreted to mean a plurality of computer readable media.

In another aspect the present invention provides a method of processing signals to provide a useful result, the method comprising the steps of:

(a) processing a first signal to calculate a value in accordance with a pseudoinverse expression, $(ZX^*Y)^+$;

(b) using the calculated value to provide a second signal; and (c) processing the second signal to provide a useful result;

wherein step (a) comprises calculating $(ZX^*Y)^+$ by performing the steps of:

(d) for $(ZX^*Y)$ forming a K×N matrix A, $A=U\Sigma V^*$, which is the Singular Value Decomposition of A, U is a matrix K×K, with the columns of U being orthonormal eigenvectors of $AA^*$, V is N×N matrix, with the columns of V being orthonormal eigenvectors of $A^*A$, wherein $AA^*$ and $A^*A$ share the same set of non-zero eigenvalues, and the square-root of these non-zero eigenvalues are the singular values of A, and $\Sigma$ is a K×N matrix with the non-zero singular values of A on the main diagonal; and (e) computing the pseudoinverse of A, $A^+=V\Sigma^+U^*$ where $\Sigma^+$ is a N×K matrix with the multiplicative inverses of the (non-zero) singular values on the main diagonal.

The present invention further provides a computer readable medium for use with one or more computers in a system for processing a signal received by an antenna in accordance with the method of this other aspect of the present invention.

Additional features of the present invention are described with reference to the detailed description of the preferred embodiments.

DISCUSSION

With reference to Expression 1 above and the subsequent definition of the terms in Expression 1, each column of X contains a single block of contiguous known information from a propagated signal of interest, and moving to the right in the matrix X results in advancing to the next block of contiguous known information in the propagated signal of interest. Thus $X^*Y$ is K×N and each tuple is the output of a correlator at a particular offset. $\underline{w}$ is a vector of complex weights that characterizes a spatial filtering process. Consider a $C\underline{c}$ that is a K-tuple vector that constitutes a channel estimate. The columns of C are translates of $$\frac{\sin(x)}{x}$$

functions with null spacings that are determined by the assumed bandwidth of the channel process. For example, 2 Hz is a typical symbol rate for HF radio channels, and so the null spacings would be ½ second. This is in accordance with the Sampling Theorem. $\underline{c}$ is a complex vector that is the weighting of the $$\frac{\sin(x)}{x}$$

functions. Expression 1 exhibits one variation on this. The channel estimate is $C_0\underline{c}_0+C\underline{c}$ where $C_0$ contains only one column and $\underline{c}_0$ is scalar. The single column of $C_0$ is a single column removed from C, with the center column being a natural choice. Without the separation of $C_0$ from C, the optimal solution for $\underline{w}$ and $\underline{c}$ would be trivially zero.

Let $\underline{\tilde{c}}$ denote the optimal solution for c, and let $\underline{\tilde{w}}$ denote the optimal solution for $\underline{w}$. Using Expression 1 with the objective using a 2-norm, the optimal solution $\underline{\tilde{c}}$ for $\underline{c}$ must satisfy:

$$\min_{\underline{c}}\|X*Y\underline{\tilde{w}}-(C_0\underline{c}_0+C\underline{c})\|^2 \qquad \{\text{Expression 2}\}$$

$$\text{where } \underline{c}_0 = 1$$

Because of the construction, the matrix C has full rank. The solution to this problem is a classic result from linear algebra (the "normal equations") and is given by:

$$C^*C\underline{\tilde{c}}=C^*(X^*Y\underline{\tilde{w}}-C_0\underline{c}_0) \qquad \{\text{Eq. 1}\}$$

or equivalently, $$\underline{\tilde{c}}=(C^*C)^{-1}C^*(X^*Y\underline{\tilde{w}}-C_0\underline{c}_0) \qquad \{\text{Eq. 2}\}$$

Using Expression 1 again, the optimal solution for $\underline{\tilde{w}}$ must satisfy, $$\min_{\underline{w}}\|X*Y\underline{w}-(C_0\underline{c}_0+C\underline{\tilde{c}})\|^2 \qquad \{\text{Expression 3}\}$$

$$\text{where } \underline{c}_0 = 1$$

or equivalently by using Equation 2, $$\min_{\underline{w}} \|X * Y\underline{w} - (C_0\underline{c}_0 + C(C*C)^{-1}C*(X*Y\underline{\tilde{w}} - C_0\underline{c}_0))\|^2 \quad \{\text{Expression 4}\}$$

where $$\underline{c}_0 = 1.$$

Let a matrix Z be given by:

$$Z = I - C(C*C)^{-1}C* \quad \{\text{Eq. 3}\}$$

Then Expression 4 may be rewritten as:

$$\min_{\underline{w}} \|ZX * Y\underline{w} - ZC_0\underline{c}_0\|^2 \quad \{\text{Expression 5}\}$$

where $\underline{c}_0 = 1$

Consider a case where an individual antenna observes the signal of interest but there is essentially no noise. Then each column of the matrix Y is a complex scalar multiple of the first column, and the matrix Y has only rank 1. The product ZX*Y has N columns but is only rank 1. Thus Expression 8 may not be solved in the same manner as Equation 1. The difficulty is that in general the solution for $\underline{\tilde{w}}$ is not unique. The standard approach to this problem from linear algebra is to choose the unique solution for $\underline{\tilde{w}}$ that lies in the row space of ZX*Y and thereby is of minimum length. This is obtained by using a pseudoinverse:

$$\underline{\tilde{w}} = (ZX*Y)^+(ZC_0\underline{c}_0) \quad \{\text{Eq. 4}\}$$

The superscript + is the pseudoinverse operator.

Equation 4 requires calculation of $(ZX*Y)^+$, which is the pseudoinverse of ZX*Y.

It is known to compute a pseudoinverse by using the Singular Value Decomposition (SVD), which is a classic matrix factorization in linear algebra. (U X*Y) results in a matrix that is K by N, where K is the number of known symbols in the message and N is the number of receiving antennas. For the remainder of this discussion pertaining to the pseudoinverse, let A=(UX*Y), where A is a K by N matrix and contains complex values.

The SVD states that any K by N matrix A can be factored into:

$$A = U\Sigma V^*, \quad \{\text{Eq. 5}\}$$

where U is a K by K matrix, wherein the columns of U contain the orthonormal eigenvectors of (AA*), V is an N by N matrix, wherein the columns of V contain the orthonormal eigenvectors of (A*A), and $\Sigma$ is a K by N matrix containing the singular values of A on the main diagonal and zeros elsewhere. The singular values of A are the square root of the nonzero eigenvalues of (A*A). Standard techniques are used to compute these eigenvalues and eigenvectors. For example, the Shifted QR Method may be used to calculate the eigenvalues, and the Shifted Inverse Power Method may be used to calculate the eigenvectors.

The pseudoinverse and the associated SVD may be difficult to compute in general, because they require eigenvalue-eigenvector decompositions. For the preferred embodiment of the present invention, wherein K is on the order of 250, computing the eigenvectors of U is prohibitively expensive.

However, in accordance with the present invention the pseudoinverse may be computed by an alternative method, which is less complex when K>>N. For example, in the preferred embodiment, there are cases wherein K is roughly 250, while N could be on the order of 4.

In accordance with the present invention a pseudoinverse is computed by performing the steps of:

(A) for (UX*Y) forming a K×N matrix A, A=U$\Sigma$V*, which is the Singular Value Decomposition of A, U is a matrix K×K, with the columns of U being orthonormal eigenvectors of AA*, V is N×N matrix, with the columns of v being orthonormal eigenvectors of A*A, wherein AA* and A*A share the same set of non-zero eigenvalues, and the square-root of these non-zero eigenvalues are the singular values of A, $\Sigma$ is a K×N matrix with the non-zero singular values of A on the main diagonal; and (B) computing the pseudoinverse of A, $A^+ = V\Sigma^+U^*$ where $\Sigma^+$ is a N×K matrix with the multiplicative inverses of the (non-zero) singular values on the main diagonal.

The expression (A*A) results in an N by N matrix, and the expression (AA*) results in a K by K matrix. Since K>>N, one can use the smaller N by N matrix and get the same result as for the K by K matrix, in much less time. Accordingly, the pseudoinverse is calculated pursuant to step (B) by performing the following steps:

Step 1: forming a matrix B=A*A;

Step 2: calculating lambda=Eigenvalues(B);

Step 3: calculating V=Eigenvectors(B, lambda);

Step 4: forming a matrix $\Sigma^+$=N×K zeros matrix, where entry $\Sigma^+_{i,i}$=1/SquareRoot(lambda$_i$);

Step 5: forming the matrix U=AV$\Sigma^+$; and

Step 6: forming the matrix $A^+=V\Sigma^+U^*$, where the diagonal entries of the matrix A+ are the multiplicative inverse of the entries in the matrix A.

Then the pseudoinverse of A, $A^+ = V\Sigma^+U^*$ $\quad \{\text{Eq. 6}\}$ where $\Sigma^+$ is a N×K matrix with the multiplicative inverses of the (non-zero) singular values on the main diagonal.

Justification of Step 4

Matrix $\Sigma$ is K by N (not square), and therefore its inverse is not computable. However, the pseudoinverse of diagonal matrix $\Sigma$ is computable as an N by K matrix, where the diagonal entries are the multiplicative inverse of the non-zero entries in the original matrix.

As a practical matter, the values of lambda that are less than some small threshold epsilon are typically discarded. This is a numerical consideration only.

Justification of Step 5

In order to obtain the larger K by K matrix U, without resorting to direct computation of eigenvectors, start with the formulation of the SVD:

$$A = U\Sigma V^* \quad \{\text{Eq. 7}\}$$

Then right-multiply both sides of the equation above with V to obtain $$AV = U\Sigma V^*V$$

Since the eigenvectors of a Hermitian matrix (V is complex, therefore V*V is Hermitian) can be chosen such that V is unitary, one can write $$AV = U\Sigma \quad \{\text{Eq. 8}\}$$

Right-multiply with the pseudo-inverse of $\Sigma$ to get $$AV\Sigma^+ = U\Sigma\Sigma^+ \quad \{\text{Eq. 9}\}$$

Now the product $\Sigma\Sigma^+$ on the right results in a K by K matrix, where the first r diagonal entries are 1 (r is the number of singular values of A, or the number of nonzero entries of $\Sigma$):

$$\Sigma\Sigma^+ = \begin{bmatrix} I_r & 0 \\ 0 & 0 \end{bmatrix}_K \quad \{\text{Eq. 10}\}$$

Similarly, on the left-hand side, we multiply by $\Sigma^+$ with the first r diagonal entries nonzero. As a result, when we compute $$U = AV\Sigma^+ \quad \{\text{Eq. 11}\}$$

we get a matrix U with r columns and K rows, where r is described above. The full matrix U is K by K:

$[U_1, U_2, \ldots, U_r, 0, 0, \ldots, 0]$

Thus one can compute the large matrix U from a relatively small number of terms.

Note that $A^+$ only depends upon the eigenvectors of $AA^*$ associated with non-zero eigenvalues. This can be seen by examination of the factor $\Sigma^+ U^*$ in $A^+$, recalling that the columns of U are the eigenvectors of $AA^*$ and that $\Sigma^+$ is N×K with the multiplicative inverses of the square-roots of the non-zero eigenvalues on the main diagonal. With A given and V and $\Sigma$ known, columns of U of interest are easily computed by $AV=U\Sigma$. V and $\Sigma$ are easy to compute when N is small, from the eigenvectors and eigenvalues of $A^*A$.

In many cases, such as when K>>N with K large and N small or N>>K with N large and K small, this alternative method of computing a pseudoinverse provides a substantial simplification.

By calculating Equation 4 and then Equation 2 one obtains a solution to the objective of Expression 1. The solution for $\tilde{w}$ and $\tilde{c}$ is closed form, but it is also possible to formulate iterative solutions to Expression 1. The Method of Steepest Descent is a standard iterative numerical technique to determine the minimum of a function of multiple variables, whereby one incrementally moves in the direction of the negative gradient of the objective function with respect to the variables over which the function is minimized. In particular, with some approximation of $\tilde{w}$ and $\tilde{c}$, one moves incrementally in the direction of the negative gradient of $\|X^*Y\underline{w} - (C_0\underline{c}_0 + C\underline{c})\|^2$ with respect to $\tilde{w}$ and $\tilde{c}$.

In the preferred embodiment, the objective of Expression 1 uses a 2-norm, to wit: $\|X^*Y\underline{w} - (C_0\underline{c}_0 + C\underline{c})\|^2$ and is usually well-justified when the noise process is Gaussian. In some situations other norms may be appropriate. In general, the objective $\|X^*Y\underline{w} - (C_0\underline{c}_0 + C\underline{c})\|^p$ for $0 < p \leq \infty$ may be used, and p=1 is a popular choice. The Simplex Algorithm is a particularly efficient method for solving problems where p=1.

When the signal of interest is received without noise and the channel impulse response is constant, the sequence of correlations obtained at the first element using the correct time and frequency offset, that is, the first column of $X^*Y$, is some constant $\hat{\alpha}$. There is an unknown multiplicative complex gain $\hat{w}$ applied to the sequence obtained from each element, where it assumed that the first tuple of $\hat{w}$ is 1. Thus the amplitude and phase of each element is unknown with respect to the others. Let $$\tilde{w} = \frac{1}{\alpha} \frac{\overline{\hat{w}}}{|\hat{w}|^2} \text{ and } \tilde{c}_* = 1,$$

where the overbar denotes complex conjugation and the subscript * denotes all tuples.

Then $\|X^*Y\tilde{w} - (C_0\underline{c}_0 + C\tilde{c})\|^2 = 0$. $\quad \{\text{Eq. 12}\}$ When the signal of interest is received with noise that is spatially white and the channel impulse response is constant, $$\tilde{w} \to \frac{1}{\alpha} \frac{\overline{\hat{w}}}{|\hat{w}|^2} \text{ and } \tilde{c}_* \to 1 \text{ as } \frac{S}{N} \to \infty,$$

where S/N is the signal-to-noise ratio. Observe that there is processing gain resulting from the correlation operation in $X^*Y$. The least-squares solution for $\tilde{c}$ is obtained by projecting $X^*Y\tilde{w}$ onto the column space of $(C_0|C)$, and this is analogous, although not identical, to a filtering operation. Lastly, weighting $X^*Y$ by $\tilde{w}$ amounts to coherent combining of corresponding samples taken from different elements of the array. It should be apparent then that this method may operate with $$\frac{S}{N} \to 0$$

depending upon the particular M, K, N, and the bandwidth of the channel process.

When the signal of interest is received without noise, a second interfering signal is received without noise and the channel impulse response is constant, the first column of $X^*Y$ is some constant $\alpha$ plus an uncorrelated random process z, that is $X^*Y_{(*,k)} = \alpha + z_k$. z is uncorrelated because the known signal is assumed pseudo-random. Suppose that the unknown multiplicative complex gain associated with the signal of interest is $\underline{w}_\alpha$, and similarly with the interfering signal is $\underline{w}_z$. Assuming that the first tuple of $\underline{w}_\alpha$ and $\underline{w}_z$ is 1, then $$X^*Y = (\alpha | z) \begin{pmatrix} \underline{w}_\alpha \\ \underline{w}_z \end{pmatrix}$$

where $\alpha$ denotes the constant vector with each tuple a constant $\alpha$.

$$\begin{pmatrix} \underline{w}_\alpha \\ \underline{w}_z \end{pmatrix} = \begin{pmatrix} w_{\alpha_1} & w_{\alpha_2} & w_{\alpha_3} & \cdots & w_{\alpha_N} \\ w_{z_1} & w_{z_2} & w_{z_3} & & w_{z_N} \end{pmatrix} \text{ is } 2 \times N, \quad \{\text{Eq. 13}\}$$

and suppose that det $$\begin{pmatrix} w_{a_i} & w_{a_j} \\ w_{z_i} & w_{z_j} \end{pmatrix} \neq 0 \text{ so that } \begin{pmatrix} w_{a_i} & w_{a_j} \\ w_{z_i} & w_{z_j} \end{pmatrix}$$

is invertible. Then $$((X^*Y)_{(*,i)} | (X^*Y)_{(*,j)}) = (\underline{\alpha} | \underline{z}) \begin{pmatrix} w_{a_i} & w_{a_j} \\ w_{z_i} & w_{z_j} \end{pmatrix} \quad \{\text{Eq. 14}\}$$

$$\Rightarrow ((X^*Y)_{(*,i)} | (X^*Y)_{(*,j)}) \begin{pmatrix} w_{a_i} & w_{a_j} \\ w_{z_i} & w_{z_j} \end{pmatrix}^{-1} = (\underline{\alpha} | \underline{z})$$

$$\Rightarrow \underline{\alpha} = ((X^*Y)_{(*,i)} | (X^*Y)_{(*,j)}) \left( \begin{pmatrix} w_{a_i} & w_{a_j} \\ w_{z_i} & w_{z_j} \end{pmatrix}^{-1} \right)_{(*,1)}$$

It follows then $$\tilde{w}_k = \begin{cases} \left( \begin{pmatrix} w_{a_i} & w_{a_j} \\ w_{z_i} & w_{z_j} \end{pmatrix}^{-1} \right)_{(1,1)} & \text{if } k = i \\ \left( \begin{pmatrix} w_{a_i} & w_{a_j} \\ w_{z_i} & w_{z_j} \end{pmatrix}^{-1} \right)_{(2,1)} & \text{if } k = j \\ 0 & \text{otherwise} \end{cases} \quad \{\text{Eq. 15}\}$$

$$\Rightarrow \|X^*Y\tilde{\underline{w}} - (C_0 \underline{c}_0 + C\underline{\tilde{c}})\|^2 = 0,$$

whereby the suppression of the interfering signal is perfect.

The only difficulty in the example of the preceding paragraph occurs when det $$\begin{pmatrix} w_{a_i} & w_{a_j} \\ w_{z_i} & w_{z_j} \end{pmatrix} = 0, \forall i, j.$$

Such a situation would arise when the source signal of interest and the source of the interfering signal are colinear with respect to a single array of receiving antennas, as shown in FIG. 1. This problem is readily resolved when the network has multiple arrays of antennas and the interfering signal is resolved by at least one of the arrays. In this case the array of antennas receiving the colinear signal of interest and the interference has signal-to-noise ratio that is lower than the signal-to-noise ratio of an array of antennas that receives both the signal of interest and the interference as non-colinear propagations.

The step of processing the sample vector to estimate a weight for the individual sample vector in accordance with Expression 1 implicitly assumes that there is no frequency error between the signal of interest and the antennas of the array, and that there is no time error between the elements of the array. In practice, the time error may be maintained near zero between the antennas of the array, but there is generally some non-zero frequency error. This is addressed by slightly increasing the assumed channel bandwidth to capture the relative frequency error between the antennas, and by mixing the receive signal over some small window. These measures significantly reduce the complexity of the problem with respect to a system that does not make any significant attempt to constrain time or frequency offsets.

The optimal weight $\tilde{\underline{w}}$ is carrier frequency dependent. The optimal weight $\tilde{\underline{w}}$ also changes if the antennas of an array do not maintain constant sample clock timing. Such a circumstance may occur when the elements are transceivers and the communication protocol consists of multiple periods of transmit and receive. This is not a problem for the array processing as presented herein, as the algorithm is adaptive and simply relearns the optimal weight $\tilde{\underline{w}}$ in each interval.

BRIEF DESCRIPTION OF THE DRAWING

FIGS. 3A through the 3E disclose an exemplary embodiment of source code for estimating the weight $\tilde{\underline{w}}$ in accordance with Expression 1.

DETAILED DESCRIPTION

Figure 1:
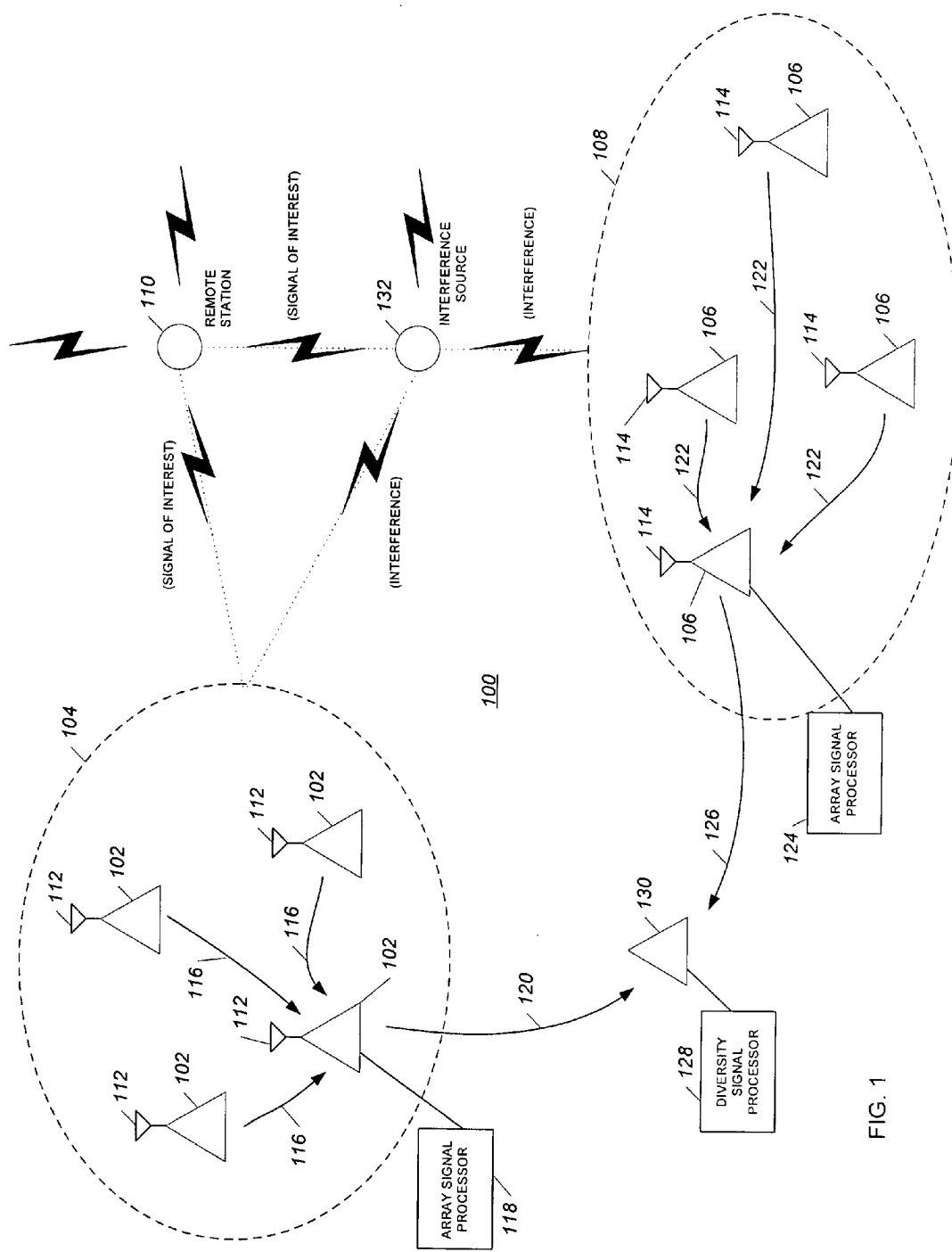
FIG. 1 is a diagram of an embodiment of an exemplary radio network in which received signals are processed in accordance with the present invention.

Referring to FIG. 1, an exemplary radio network 100 includes a first plurality of spatially separated base stations 102 that are located in a first common region 104 and second plurality of spatially separated base stations 106 that are located in a second common region 108. The second common region 108 is disposed at a different bearing than the first region 104 with respect to a particular remote station 110 from which a modulated and encoded signal is transmitted. The network 100 also includes additional remote stations (not shown). The transmitted signal is modulated and encoded for transmission from the remote station 110 by modulating the signal for transmission by embedding known information throughout the signal in a predetermined pattern; and encoding the signal for transmission by processing the signal with a first feature, such as a complex pseudorandom number.

A first array of antennas 112 are respectively disposed at the base stations 102 which are located in the first common region 104; and a second array of antennas 114 are respectively disposed at the base stations 106 which are located in the second common region 108. The antennas 112, 114 of each array are separated spatially by some minimum distance, but the antennas of each array are constrained to exist within a respective common region 104, 108 having a maximum area. The maximum area is such that the channel characteristics from the intended signal source to each receiver are strongly correlated. The area is roughly expected to have a maximum diameter of 10 km for receiving signals from distant signal sources.

The receivers for each array of antennas 112, 114 are programmed to sample arriving signals relatively simultaneously such that each captured sample of a set of sample vectors is taken within a very small time window. Further, the step of providing a set of sample vectors of the received signal begins and ends at the same time at the receivers of all of the base stations 102, 106. Finally, the relative frequency error between the base station 102, 106 and a particular source of the received signal, such as a remote station 110, is compensated for by the particular source. The amount of frequency error correction is determined through measurement of one or more downlink transmissions. These details are prerequisites of the invention, but they are not addressed directly as their implementation is part of the prior art.

Since the sample vectors of the signal received by the different antennas 112, 114 are provided by the receivers of the different base stations 102, 106 at nearly the same instant, each set of sample vectors will have a different carrier phase in relation to the others. It is possible to weight each set of sample vectors so that the carrier phases are equal, although this is not necessary.

A first group of sample vectors 116 is obtained by the base stations 102 located in the first common region 104 by sampling a signal that is received simultaneously by the first array of antennas 112. The first group of sample vectors 116 is collected and provided to a first array signal processor 118, which is coupled to one of the base stations 102 located in the first common region 104. The first array signal processor 118 processes the first group of sample vectors 116 to provide a first resultant sample vector 120.

A second group of sample vectors 122 is obtained by the base stations 106 located in the second common region 108 by sampling a signal that is received simultaneously by both the second array of antennas 114 and the first array of antennas 112. The second group of sample vectors 122 are collected and provided to a second array signal processor 124, which is coupled to one of the base stations 106 located in the second common region 104. The second array signal processor 124 processes the second group of sample vectors 122 to provide a second resultant sample vector 126. Each resultant sample vector 120, 126 provides a joint optimization of the signal weights and an estimate of the channel time-varying impulse response in order to minimize a mean square error metric.

Since each resultant sample vector 120, 126 may be regarded as an output sample vector from a single receiver, each sample vector 120, 126 may be applied as a front-end to processors of existing standard waveforms that include the required known signal (the X matrix). Examples of this would include the HF military standards Mil-Std-188-110B and Mil-Std-188-141B. Essentially, the array processing is transparent and may be used to augment the performance of existing waveforms not specifically designed for use with antenna arrays.

The first resultant sample vector 120 and the second resultant sample vector 126 are collected and provided to a diversity signal processor 128 which processes the first and second resultant sample vectors 120, 126 with the known information in the predetermined embedding pattern in order to detect a received signal that resulted from propagation of the transmitted signal from the particular remote station 110. The diversity signal processor 128 processes the collected resultant sample vectors 120, 126 with the known information in the predetermined embedding pattern in order to detect a received signal that resulted from propagation of the transmitted signal.

Preferred embodiments of the processing of collected sample vectors of the received signal by a diversity signal processor and the modulation and encoding of the signal for transmission from the remote station 110 are described in a co-pending patent application entitled "Detection of Signals in a Radio Network" being filed on even date herewith by James Covosso Francis, Christopher Robert Brown, Howard Glen Ebersman, John Edward Gorton, David Mark Smith and James Robert Tiffany. James Covosso Francis is the sole inventor named in the present application. The content of said co-pending application is incorporated herein by reference.

In an alternative embodiment, the signal that is transmitted from a remote station 110 of the network is not modulated for transmission by embedding known information throughout the signal in a predetermined pattern, but instead a weak known-information signal is superimposed onto a message-modulated waveform to enable the processing of the received signal in accordance with Expression 1 to estimate the weight.

Although the third signal processor 128 is shown as being coupled to a base station 130 that is not located in either the first common region 104 or the second common region 108, in an alternative embodiment, the third signal processor 128 can be coupled to a base station 130 that is located in either the first common region 104 or the second common region 108.

During the processing of the first and second groups of sample vectors 116, 122 by the respective first and second array signal processors 118, 124, each individual sample vector 116, 122 is separately processed with the known information in the signal transmitted from the particular remote station 110 to estimate a weight for the individual sample vector that maximizes the energy of a sample vector that resulted from propagation of the signal from a remote station of the network 100 and/or minimizes the energy of a sample vector that resulted from interference with propagation of the signal from a remote station of the network 100 and thereby enhance detection of the received signal from which the sample vector is provided. The estimated weight is vector of complex values that are constant.

The individual sample vectors 116 of the first group are processed with the respectively estimated weights to provide a first group of separately weighted sample vectors and the individual sample vectors 122 of the second group are processed with the respectively estimated weights to provide a second group of separately weighted sample vectors. The first group of separately weighted sample vectors is combined by summation to provide a first resultant weighted sample vector 120; and the second group of separately weighted sample vectors is combined by summation to provide a second resultant weighted sample vector 126.

In FIG. 1, a source of interference 132 is shown in the vicinity of the particular remote station 110 from which the signal is transmitted, with the interference source 132 being located between the remote station 110 and the second common region 108, but not between the remote station 110 and the first common region 104. In view of the location of the interference source 132 relative to the first common region 104 and the second common region 108, the weights estimated for the respective sample vectors 116 of the first group provided from the first array of antennas 112 in the first common region 104 will better enhance detection of the received signal than will the weights estimated for the respective sample vectors 122 of the second group provided from the second array of antennas 114 in the second common region 108. Thus by utilizing different arrays of antennas respectively located at spatially separated base stations in different common regions having different bearings with respect to a particular remote station, there is a greater probability of detecting the transmitted signal when there is a source of interference 132 between one, but not the other, of these regions 104, 108 and the particular remote station 110 from which the signal is transmitted.

In alternative versions of this embodiment, (a) all of the base stations of the network are included in a singular common region and only one resultant sample vector is provided to a signal processor, such as the signal processor 128, for processing the sample vectors provided thereto; and/or (b) the signal processor that processes the resultant sample vector(s) also processes in the same manner sample vectors that are not weighted and/or are not combined with other sample vectors to provide a resultant sample vector.

The processing described herein is suitable to both Adaptive Link Establishment (ALE) and Automatic Repeat reQuest (ARQ). In particular, because the solution is closed form it may be applied to transmissions that are very short duration, as with ALE. It does not suffer the delay of an acquisition process.

Figure 2:
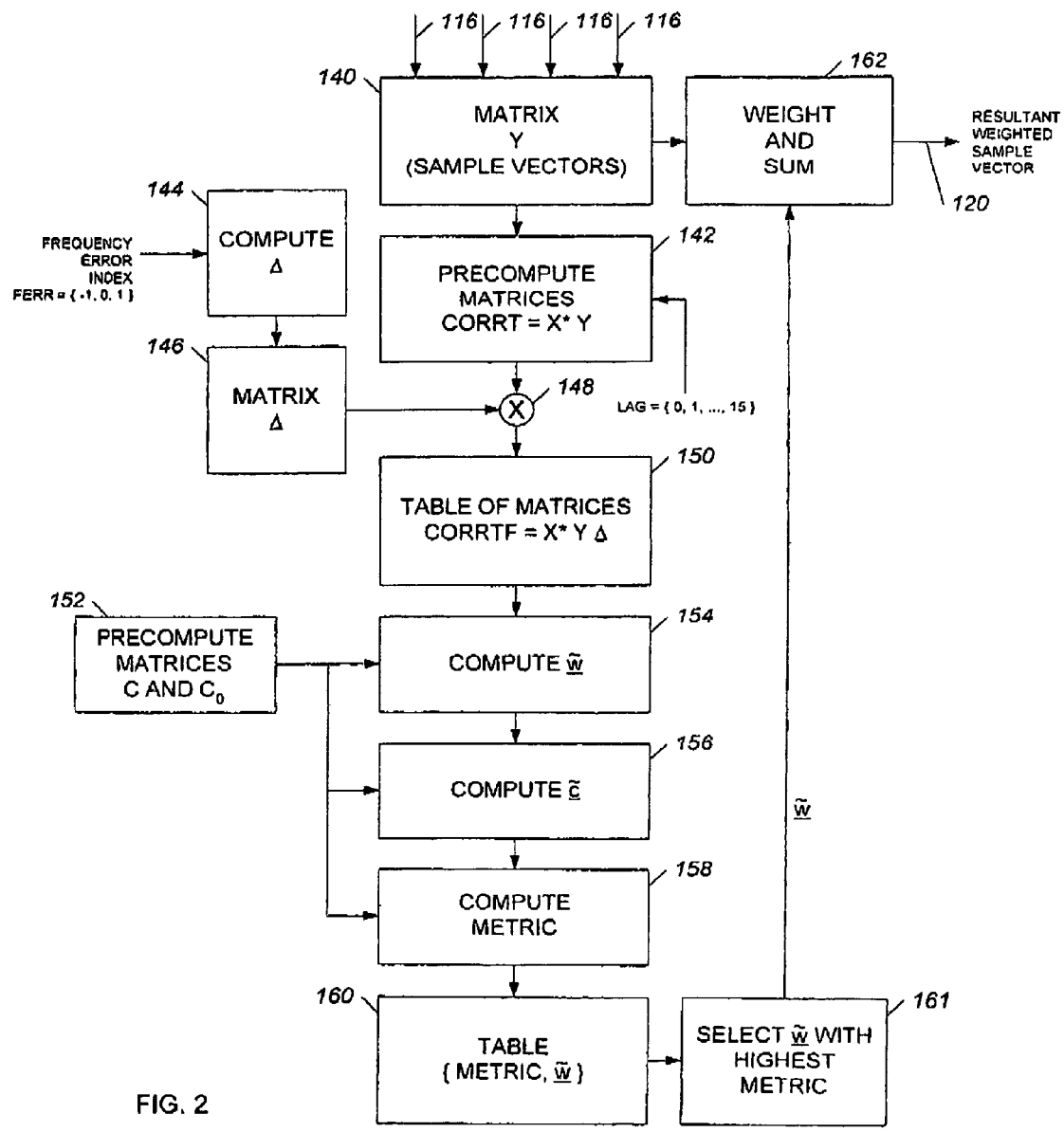
FIG. 2 is a block diagram showing certain functions performed by each of the array signal processors shown in FIG. 1.

Referring to FIG. 2, only the processing performed by the array signal processor 118 of the sample vectors 116 is described. The array signal processor 124 processes the sample vectors 122 in the same manner as described for the array signal processor 118.

The sample vectors 116 of a signal simultaneously received by the array of antennas 116 are processed, as shown at 140, to provide a matrix Y, in which the sample vectors are stored as columns.

The sample vectors 116 in the matrix Y are processed, as shown at 142, to provide a set of time-lagged copies of each sample vector and to pre-compute a group of matrices of correlation sums, CORRT=X*Y, for each of the time-lagged copies of each sample vector. The first row of each CORRT matrix is indexed by the offset lag of each time-lagged copy of the sample vector. The offset lag index is 0, 1, 2, ..., 15. The set of time-lagged copies includes the original non-lagged sample vector, for which the time lag is zero.

A frequency error vector $\Delta$ of complex values is computed, as shown at 144. Frequency error is accounted for in the computation of the weight $\underline{w}$. Frequency error must be removed from the copies of the sample vector that are processed to in order to compute $\underline{w}$ in order to make a correct estimate of the weight $\underline{w}$ for each sample vector. The computation of an estimated frequency vector $\Delta$ is made by an enumerative search over a finite set of frequency errors as defined by a frequency error index $F_{ERR}=-1$, 0 or 1 for different frequency error parameter values.

$$\Delta_n(FERR) = e^{\frac{2\pi \cdot i \cdot \beta \cdot FERR \cdot (n-1)}{2 \cdot framerate}} \quad \{Eq. 16\}$$

where * is the Hermitian operator, n={1, 2, ..., K},
K is the number of known symbols,
framerate is the rate at which known symbols appear in time, and
$\beta$ is the assumed bandwidth of the channel process.

In a preferred embodiment, the framerate=2400/framesize, where framesize=(length of known symbol)+(length of unknown symbol), and $\beta$=framerate/(number of known symbols).

The computed values of the frequency error vector $\Delta$ for each particular frequency error parameter value FERR is stored in a matrix $\Delta$, as shown at 146.

Each of the computed values of the frequency error vector $\Delta$ is multiplied, as shown at 146, term-by-term with each of the values in each of the columns of the CORRT matrix for each set of time-lagged copies of each of the sample vectors; and the respective frequency-error-corrected values of the time-lagged copies of each of the sample vectors that are produced by such term-by-term multiplication are stored in a table of matrices CORRTF 150. The table of matrices CORRTF 150 is indexed by both the offset-lag index and the $F_{ERR}$ index.

Matrices C and $C_0$ are pre-computed as shown at 152. A number of other sub-expressions that are constant and derived from the C matrices are listed below.

$t1=(C*C)^{-1}$ $t2=(C*C)^{-1}C*$ $s1=C_0 c_0-C(t1(C*C_0))$ $s2=t2 C_0 c_0$

An optimum value we of the weight $\underline{w}$ is computed separately for each individual sample vector, as shown at 154 by processing each of the frequency-error-corrected, time-lagged copies of the sample vector in the CORRTF matrix 150 with the C matrix and the sub-expression t1 derived from the C matrix to calculate an optimum value we of the weight $\underline{w}$ for each frequency-error-corrected, time-lagged copy in accordance with the equation $$\underline{\hat{w}}=(ZX*Y)^+(ZC_0 \underline{c}_0). \quad \{Eq. 4\}$$

The optimum value we is computed in two steps:
Step 1: s3=CORRTF−C t1 C*CORRTF
Step 2: we=pseudoinverse(s3) s1
The pseudoinverse is computed as described above following the initial recitation of Equation 4.

An optimal value cwe of the vector $\underline{c}$ is computed separately for each individual sample vector, as shown at 156 by processing each of the frequency-error-corrected, time-lagged copies of the sample vector in the CORRTF matrix 150 with the C and $C_0$ matrices, the sub-expressions t2, s1 and s2 derived from the C and $C_0$ matrices, and the optimum value we of the weight $\underline{w}$ computed for the particular frequency-error-corrected, time-lagged copy of the sample vector in accordance with the following equation:

$$\underline{\hat{c}}=(C*C)^{-1}C*(X*Y\underline{\hat{w}}-C_0 \underline{c}_0); \quad \{Eq. 2\}$$

The optimum value cwe is computed in two steps:
Step 1: s4=corrtf we
Step 2: cwe=t2 s4−s2

A metric indicating an optimal weight for each particular frequency-error-corrected, time-lagged copy of the sample vector is computed, as shown at 158. The metric is computed by using the optimal weight we for the copy and the optimal vector cwe that was calculated for the copy together with the C and $C_0$ matrices and the sub-expression s4 computed incident to the computation of the optimal vector cwe at 156. The metric is a ratio of the square magnitude of the channel estimate to the value computed in Equation 1. The metric is computed in two steps:
Step 1: ce=$C_0$+C cwe $$\text{Step 2: metric} = \frac{\|ce\|^2}{\|ce - s4\|^2}$$

All of the metrics computed for an individual sample vector are accumulated in a table, as shown at 160 the metrics are paired in the matrix with the respective optimal value we of the weight $\underline{w}$ that was used to compute the particular metric. Even though the entries to the table are indexed by the offset-lag index and the $F_{ERR}$ index, it is not necessary to keep track of the particular time-lag or frequency error.

The estimated weight $\underline{w}$ for the individual sample vector is determined by identifying the metric in the table 160 that indicates the largest optimal weight we, as shown at 161, and selecting the calculated optimal weight we that was used to calculate the identified metric to be the estimated weight $\underline{w}$.

In summary, an enumerative search is conducted over the set of lags and frequency errors "ferr", where for each (lag, ferr) an optimum weight vector and channel response is computed. The optimum weight is stored with a variant of the value of Equation 1, referred to as a metric. The metric provides a figure of merit for each weight estimation with respect to the weights computed for other lag and frequency error values. When all (metric, weight) pairs have been computed, one merely needs to find the weight associated with the maximum metric value over the set of metrics computed. In the final step, the exact values of the offset lag and the frequency error no longer matter.

Each of the individual sample vectors is retrieved from the Y matrix 140 and processed with the estimated weight $\underline{w}$ for the individual sample vector to provide a weighted sample vector and all of the weighted sample vectors are summed, as shown at 162, to provide a resultant weighted sample vector 120 in which the known information is enhanced and the interference is suppressed.

At least a portion of each of the signal processors 118, 124, 128 is embodied in one or more computers. A computer readable medium, which is provided for use with the computer(s), contains program instructions for causing the computer(s) to perform one or more functions of the signal processor. As used herein, the term computer readable medium is not limited to one computer readable medium, but may also be interpreted to mean a plurality of computer readable media.

In the preferred embodiment, array processing is performed only on the uplink. However, this technique can be used in any application where there are multiple receivers.

Not all of the features of the various embodiments described herein are included in any single embodiment of the present invention.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein.

Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of processing a signal received simultaneously by an array of antennas for the purpose of enhancing information that resulted from propagation of the signal from a known signal source of a set of predetermined signal sources and for suppressing interference with said information, the method comprising the steps of:

(a) processing sample vectors of a signal received simultaneously by an array of antennas to estimate a weight for each sample vector that maximizes the energy of the individual sample vector that resulted from propagation of the signal from a known signal source of a set of predetermined signal sources and/or minimizes the energy of the sample vector that resulted from interference with propagation of the signal from the known signal source;

(b) summing each of the sample vectors with the weight that is estimated for the respective sample vector to provide a plurality of weighted sample vectors; and (c) summing the plurality of weighted sample vectors to provide a resultant weighted sample vector for the received signal;

wherein step (b) comprises the step of:

(d) processing the sample vector in accordance with the following expression:

$$\min_{\underline{w},\underline{c}} \|X^*Y\underline{w} - (C_0 \underline{c}_0 + C\underline{c})\|^p \qquad \{\text{Expression 1}\}$$

where $\underline{c}_0 = 1$ and $0 < p \le \infty$.

wherein:

X represents known information symbols in a signal of interest, which is a signal propagated from a signal source of the set of predetermined signal sources;

X is an M×K matrix and holds portions of a PN sequence related to the known information symbols;

the Hermitian (*) operator produces the conjugate transpose of X;

the PN sequence is composed of complex values $p_i$, where $|p_i|=1$;

each column of X is used to perform correlation against one of the known information symbols so that part of a column of X is a part of the PN sequence, and the rest of the column is zeros;

Y represents the sample vectors;

Y is an M×N matrix, where N is the number of antennas in an array of antennas;

each column of Y is a sample vector representing a signal burst as received by one of the antennas;

$\underline{w}$ is a vector of complex values;

the product X*Y results in a matrix of correlation sums, and is K×N, with each column of the product X*Y containing correlation sums for the known information symbols in the signal burst, whereby the rows represent the known information symbols and the columns represent the antennas, multiplication of the complex value of the vector $\underline{w}$ with each column of the product X*Y results in a complete product (X*Y w) that is a K×1 matrix of complex values, one for each known information symbol of X;

the column space of C and $C_0$ provides a basis for a channel estimate, where the basis function basis(n) is computed using the definitions:

basis($n$)=Sin $c(\pi n$/nullspacing) Hamming ($n$/(nullcount nullspacing)), where Sin $c(x)$=Sin($x$)/$x$, $x \ne 0$, 1 otherwise, Hamming($x$)=0.54 +0.46 Cos($\pi x$), $\|x\| \le 1$ 0 otherwise, where n, nullcount and nullspacing are integers;

a matrix C' with elements $c'_{m,n}$ is computed as;

$c'_{m,n}$=basis($m$−tcenter−$n$ nullspacing), where m={0, 1, . . . , K−1}, n={−cwcount, −(cwcount−1), . . . , 0, 1, cwcount}, tcenter=K/2, where K=the number of known symbols, and cwcount=Ceiling(tcenter/nullspacing)+nullcount, where Ceiling is a standard mathematical function and Ceiling (x) is the largest integer that does not exceed x;

matrix C is the matrix C' with one column, preferably the center column, removed, resulting in a K×(cwcount−1) matrix;

matrix $C_0$ is the one column of the matrix C' that is removed from the matrix C' resulting in a K×1 matrix, where K is the number of known information symbols;

$c_0$ and c are complex weights for the columns of $C_0$ and C, with $c_0$=1 by definition to thereby prevent a trivial solution to the objective of Expression 1; and vector c is a set of complex values that weight the columns of matrix C, and is (cwcount−1)×1 with the result of the computation of ($C_0c_0$+Cc) being a K×1 matrix.

2. A method according to claim 1, wherein the minimized term in the expression recited in step (d) is $\|X^*Y\underline{w}-(C_0\underline{c}_0+C\underline{c})\|^2$.

3. A method according to claim 1, wherein step (d) comprises the steps of:

(e) providing a set of time-lagged copies of each sample vector;

(f) processing each copy of each set to calculate the weight $\underline{w}$ for the particular set in accordance with the following equation: $\hat{\underline{w}}=(ZX^*Y)^+(ZC_0\underline{c}_0)$;

(g) processing each copy of each set to calculate the vector $\underline{c}$ for the particular set in accordance with the following equation: $\tilde{\underline{c}}=(C^*C)^{-1}C^*(X^*Y\hat{\underline{w}}-C_0\underline{c}_0)$;

(h) for each copy of each set, using the weight $\underline{w}$ and the vector $\underline{c}$ that were calculated for said copy to calculate a metric indicating an optimal weight for said copy:

(i) accumulating the calculated values of said metric in a table;

(j) for each set, identifying the metric in said table that indicates the largest optimal weight for the respective sample vector; and (k) for each set, selecting the calculated weight $\underline{w}$ that was used to calculate the identified metric to be the estimated weight $\underline{w}$ that is used to weight the respective sample vector pursuant to step (b);

wherein Z is a matrix given by: $Z=I-C(C^*C)^{-1}C^*$.

4. A method according to claim 3, wherein step (f) comprises calculating $(ZX^*Y)^+$ by performing the steps of:

(l) for $(ZX^*Y)$ forming a K×N matrix A, $A=U\Sigma V^*$, which is the Singular Value Decomposition of A, U is a matrix K×K, with the columns of U being orthonormal eigenvectors of $AA^*$, V is N×N matrix, with the columns of V being orthonormal eigenvectors of $A^*A$, wherein $AA^*$ and $A^*A$ share the same set of non-zero eigenvalues, and the square-root of these non-zero eigenvalues are the singular values of A, Σ is a K×N matrix with the non-zero singular values of A on the main diagonal; and (m) computing the pseudoinverse of A, $A^+=V\Sigma^+U^*$ where $\Sigma^+$ is a N×K matrix with the multiplicative inverses of the (non-zero) singular values on the main diagonal.

5. A method according to claim 4, wherein step (m) comprises the steps of:

(n) forming a matrix $B=A^*A$;

(o) calculating lambda=Eigenvalues(B);

(p) calculating V=Eigenvectors(B, lambda);

(q) forming a matrix $\Sigma^+$=N×K zeros matrix, where entry $\Sigma^+_{i,i}$=1/Square-root(lambda$_i$);

(r) forming the matrix $U=AV\Sigma^+$; and (s) computing the matrix $A^+=V\Sigma^+U^*$, where the diagonal entries of the matrix A+ are the multiplicative inverse of the entries in the matrix A.

6. A method according to claim 1 for processing a received signal having a known-information signal superimposed onto a message-modulated waveform to enable the processing of step (d).

7. A system for processing a signal received simultaneously by an array of antennas for the purpose of enhancing information that resulted from propagation of the signal from a known signal source of a set of predetermined signal sources and for suppressing interference with said information, the system comprising:

means for processing sample vectors of a signal received simultaneously by an array of antennas to estimate a weight for each sample vector that maximizes the energy of the individual sample vector that resulted from propagation of the signal from a known signal source of a set of predetermined signal sources and/or minimizes the energy of the sample vector that resulted from interference with propagation of the signal from the known signal source;

means for summing each of the sample vectors with the weight that is estimated for the respective sample vector to provide a plurality of weighted sample vectors; and means for summing the plurality of weighted sample vectors to provide a resultant weighted sample vector for the received signal;

wherein the means for estimating the weight comprise:

means for processing the sample vector in accordance with the following expression:

$$\min_{\underline{w},\underline{c}}\|X^*Y\underline{w}-(C_0\underline{c}_0+C\underline{c})\|^p \quad \{\text{Expression 1}\}$$

where $\underline{c}_0=1$ and $0<p\leq\infty$.

wherein:

X represents known information symbols in a signal of interest, which is a signal propagated from a signal source of the set of predetermined signal sources;

X is an M×K matrix and holds portions of a PN sequence related to the known information symbols;

the Hermitian (*) operator produces the conjugate transpose of X;

the PN sequence is composed of complex values $p_i$, where $|p_i|=1$;

each column of X is used to perform correlation against one of the known information symbols so that part of a column of X is a part of the PN sequence, and the rest of the column is zeros;

Y represents the sample vectors;

Y is an M×N matrix, where N is the number of antennas in an array of antennas;

each column of Y is a sample vector representing a signal burst as received by one of the antennas;

$\underline{w}$ is a vector of complex values;

the product $X^*Y$ results in a matrix of correlation sums, and is K×N, with each column of the product $X^*Y$ containing correlation sums for the known information symbols in the signal burst, whereby the rows represent the known information symbols and the columns represent the antennas, multiplication of the complex value of the vector $\underline{w}$ with each column of the product $X^*Y$ results in a complete product (X*Y w) that is a K×1 matrix of complex values, one for each known information symbol of X;

the column space of C and $C_0$ provides a basis for a channel estimate, where the basis function basis(n) is computed using the definitions:

basis($n$)=Sin $c(\pi n$/nullspacing) Hamming($n$/(nullcount nullspacing)), where Sin $c(x)$=Sin $(x)/x$, $x\neq 0$, 1 otherwise, Hamming($x$)=0.54+0.46 Cos $(\pi x)$, $\|x\|\leq 1$ 0 otherwise, where n, nullcount and nullspacing are integers;

a matrix C' with elements $c'_{m,n}$ is computed as:

$c'_{m,n}$=basis($m$−tcenter−$n$ nullspacing), where m={0, 1, . . . , K−1}, n={−cwcount, −(cwcount−1), . . . , 0, 1, cwcount}, tcenter=K/2, where K=the number of known symbols, and cwcount=Ceiling(tcenter/nullspacing)+nullcount, where Ceiling is a standard mathematical function and Ceiling (x) is the largest integer that does not exceed x;

matrix C is the matrix C' with one column, preferably the center column, removed, resulting in K×(cwcount−1) matrix;

matrix $C_0$ is the one column of the matrix C' that is removed from the matrix C' resulting in a K×1 matrix, where K is the number of number of known information symbols;

$c_0$ and c are complex weights for the columns of $C_0$ and C, with $c_0$=1 by definition to thereby prevent a trivial solution to the objective of Expression 1; and vector c is a set of complex values that weight the columns of matrix C, and is (cwcount−1)×1 with the result of the computation of $(C_0 c_0 + Cc)$ being a K×1 matrix.

8. A system according to claim 7, wherein the minimized term in said expression is $\|X*Y\underline{w}-(C_0\underline{c}_0+C\underline{c})\|^2$.

9. A non-transitory computer readable medium for use with one or more computers in a system for processing a signal received simultaneously by an array of antennas for the purpose of enhancing information that resulted from propagation of the signal from a known signal source of a set of predetermined signal sources and for suppressing interference with said information, the system comprising signal processing means embodied in said one or more computers for processing sample vectors of a signal received simultaneously by an array of antennas to estimate a weight for each sample vector that maximizes the energy of the individual sample vector that resulted from propagation of the signal from a known signal source of a set of predetermined signal sources and/or minimizes the energy of the sample vector that resulted from interference with propagation of the signal from the known signal source; means for summing each of the sample vectors with the weight that is estimated for the respective sample vector to provide a plurality of weighted sample vectors; and means for summing the plurality of weighted sample vectors to provide a resultant weighted sample vector for the received signal, wherein the computer readable medium contains program instructions for causing the signal processing means to estimate the weight by processing the sample vector in accordance with the following expression:

$$\min_{\underline{w},\underline{c}} \| X * Y\underline{w} - (C_0\underline{c}_0 + C\underline{c}) \|^p \quad \text{where} \quad \{\text{Expression 1}\}$$

$\underline{c}_0 = 1$ and $0 < p \leq \infty$ wherein:

X represents known information symbols in a signal of interest, which is a signal propagated from a signal source of the set of predetermined signal sources;

X is an M×K matrix and holds portions of a PN sequence related to the known information symbols;

the Hermitian (*) operator produces the conjugate transpose of X;

the PN sequence is composed of complex values $p_i$, where $|p_i|=1$;

each column of X is used to perform correlation against one of the known information symbols so that part of a column of X is a part of the PN sequence, and the rest of the column is zeros;

Y represents the sample vectors;

Y is an M×N matrix, where N is the number of antennas in an array of antennas;

each column of Y is a sample vector representing a signal burst as received by one of the antennas;

$\underline{w}$ is a vector of complex values;

the product X*Y results in a matrix of correlation sums, and is K×N, with each column of the product X*Y containing correlation sums for the known information symbols in the signal burst, whereby the rows represent the known information symbols and the columns represent the antennas, multiplication of the complex value of the vector $\underline{w}$ with each column of the product X*Y results in a complete product (X*Y w) that is a K×1 matrix of complex values, one for each known information symbol of X;

the column space of C and $C_0$ provides a basis for a channel estimate, where the basis function basis(n) is computed using the definitions:

basis($n$)=Sin $c(\pi n$/nullspacing) Hamming($n$/(nullcount nullspacing)), where Sin $c(x)$=Sin $(x)/x$, $x\neq 0$, 1 otherwise, Hamming($x$)=0.54+0.46 Cos $(\pi x)$, $\|x\|\leq 1$ 0 otherwise, where n, nullcount and nullspacing are integers;

a matrix C' with elements $c'_{m,n}$ is computed as:

$c'_{m,n}$=basis($m$−tcenter−$n$ nullspacing), where m={0, 1, . . . , K−1}, n={−cwcount, −(cwcount−1), . . . , 0, 1, cwcount}, tcenter=K/2, where K=the number of known symbols, and cwcount=Ceiling(tcenter/nullspacing)+nullcount, where Ceiling is a standard mathematical function and Ceiling (x) is the largest integer that does not exceed x;

matrix C is the matrix C' with one column, preferably the center column, removed, resulting in K×(cwcount−1) matrix;

matrix $C_0$ is the one column of the matrix C' that is removed from the matrix C' resulting in a K×1 matrix, where K is the number of known information symbols;

$c_0$ and c are complex weights for the columns of $C_0$ and C, with $c_0$=1 bydefinition to thereby prevent a trivial solution to the objective of Expression 1; and vector c is a set of complex values that weight the columns of matrix C, and is (cwcount−1)×1 with the result of the computation of $(C_0 c_0 + Cc)$ being a K×1 matrix.

10. The computer readable medium according to claim 9, wherein the minimized term in said expression is $\|X*Y\underline{w}-(C_0\underline{c}_0+C\underline{c})\|^2$.

11. The computer readable medium according to claim 9, containing program instructions for causing the signal processing means to process the sample vectors to estimate a weight for each sample vector by performing the steps of:

(a) providing a set of time-lagged copies of each sample vector;

(b) processing each copy of each set to calculate the weight $\underline{w}$ for the particular set in accordance with the following equation: $\underline{\tilde{w}}=(ZX^*Y)^+(ZC_0\underline{c}_0)$;

(c) processing each copy of each set to calculate the vector $\underline{c}$ for the particular set in accordance with the following equation: $\underline{\tilde{c}}=(C^*C)^{-1}C^*(X^*Y\underline{\tilde{w}}-C_0\underline{c}_0)$;

(d) for each copy of each set, using the weight $\underline{w}$ and the vector $\underline{c}$ that were calculated for said copy to calculate a metric indicating an optimal weight for said copy:

(e) accumulating the calculated values of said metric in a table;

(f) for each set, identifying the metric in said table that indicates the largest optimal weight for the respective sample vector; and (g) for each set, selecting the calculated weight $\underline{w}$ that was used to calculate the identified metric to be the estimated weight $\underline{w}$ that is combined with the respective sample vector to provide the respective weighted sample vector, wherein Z is a matrix given by: $Z=I-C(C^*C)^-C^*$.

12. The computer readable medium according to claim 11, wherein step (b) comprises calculating $(ZX^*Y)^+$ by performing the steps of:

(h) for $(ZX^*Y)$ forming a K×N matrix A, $A=U\Sigma V^*$, which is the Singular Value Decomposition of A, U is a matrix K×K, with the columns of U being orthonormal eigenvectors of $AA^*$, V is N×N matrix, with the columns of V being orthonormal eigenvectors of $A^*A$, wherein $AA^*$ and $A^*A$ share the same set of non-zero eigenvalues, and the square-root of these non-zero eigenvalues are the singular values of A, $\Sigma$ is a K×N matrix with the non-zero singular values of A on the main diagonal; and (i) computing the pseudoinverse of A, $A^+=V\Sigma^+U^*$ where $\Sigma^+$ is a N×K matrix with the multiplicative inverses of the (non-zero) singular values on the main diagonal.

13. The computer readable medium according to claim 12, wherein step (i) comprises the steps of:

(j) forming a matrix $B=A^*A$;

(k) calculating lambda=Eigenvalues(B);

(l) calculating V=Eigenvectors(B, lambda);

(m) forming a matrix $\Sigma^+$=N×K zeros matrix, where entry $\Sigma^+_{i,i}=1/$Square-root$(lambda_i)$;

(n) forming the matrix $U=AV\Sigma^+$; and (o) computing the matrix $A^+=V\Sigma^+U^*$, where the diagonal entries of the matrix A+ are the multiplicative inverse of the entries in the matrix A.

* * * * *

UNITED STATES PATENT AND TRADEMARK OFFICE
CERTIFICATE OF CORRECTION

| | | |
|---|---|---|
| PATENT NO. | : 7,873,127 B2 | Page 1 of 1 |
| APPLICATION NO. | : 11/803561 | |
| DATED | : January 18, 2011 | |
| INVENTOR(S) | : James Covosso Francis | |

It is certified that error appears in the above-identified patent and that said Letters Patent is hereby corrected as shown below:

Column 6, line 11, "v" should be --V--
Column 17, line 45, "$Z = I - C(C*C)^{31\ 1}C*$" should be --$Z = I - C(C*C)^{-1}C*$--
Column 19, line 28, "of number" should be omitted
Column 20, line 60, "bydefinition" should be --by definition--
Column 21, line 27, "$Z = I - C(C*C)^-C*$" should be --$Z = I - C(C*C)^{-1}C*$--

Signed and Sealed this

Thirteenth Day of September, 2011

David J. Kappos
*Director of the United States Patent and Trademark Office*